Patented Aug. 15, 1944

2,355,974

UNITED STATES PATENT OFFICE 2,355,974

INSECTICIDAL COMPOSITION

Edward Harvill, Yonkers, N. Y., assignor to Boyce Thompson Institute for Plant Research, Inc., a corporation of New York No Drawing. Application July 20, 1940, Serial No. 346,558

2 Claims. (Cl. 167—24)

This invention relates to insecticidal compositions particularly useful in combating insect pests, such as flies, mosquitoes, moths, gnats, and the like, and has for its object the provision of an improved insecticidal composition.

I have discovered a group of organic toxicants possessing marked toxicity towards insects and also possessing the property of advantageously augmenting the toxicity of certain now commonly used toxicants of vegetable origin such as the extracts of pyrethrin- and rotenone-bearing plants. The toxicants I have discovered may be generally characterized as allyl or propenyl phenols and certain derivatives thereof. The toxic properties of these products appear to be largely due to the allyl or propenyl phenol structure, and generally speaking an increase of the allyl or propenyl radicals causes an increase in the toxicity of the product. Based on these discoveries, the present invention contemplates an improved insecticidal composition containing one or more of these organic toxicants, with or without pyrethrum extracts, rotenone and derris extracts.

Insecticidal compositions containing pyrethrum are widely used in combating insect pests. Commonly, the pyrethrum is dissolved in a solvent base of the hydrocarbon or mineral oil type such as odorless kerosene, naphtha etc. While these insecticidal compositions have good toxic properties and are well suited for the control of house flies and the like, they are expensive due to the cost of pyrethrum. Various synthetic products have heretofore been proposed as substitutes for pyrethrum, but the toxicity of these products is usually so low that objectionably high concentrations must be included in the insecticidal composition to attain satisfactory results.

Rotenone is extremely toxic to flies and is commonly used in insecticidal compositions and sprays. Its action on flies is relatively slow, and its knockdown capacity is lower than is required of a completely satisfactory toxicant. Hence, rotenone is frequently used in conjunction with pyrethrum and other toxicants which have a rapid paralyzing action on flies and other insects and cause a satisfactory knockdown.

The organic toxicants of the invention may be used alone or in conjunction with pyrethrum, or rotenone, or derris extract or combinations thereof. These organic toxicants cause rapid paralysis of the flies and hence have a high knockdown capacity, and in addition possess high killing power. Mixtures of the organic toxicants of the invention with rotenone produce extremely effective insecticidal compositions with respect to both knockdown and kill. In its preferred form, the insecticidal composition of the invention is in the form of a spray having a mineral oil base in which the organic toxicant is soluble, or in which the toxicant and pyrethrum or rotenone or derris extract, when used, are mutually soluble. If desired, the organic toxicant may be first dissolved in a secondary organic solvent, itself soluble in the mineral oil base, and the resulting solution then added to the mineral oil base, which may or may not contain pyrethrum, or rotenone, or derris extract, or combinations thereof. Ethylene glycol monoethyl ether is an especially satisfactory secondary solvent, particularly when the insecticidal composition contains rotenone. Very effective insecticidal compositions of the invention are obtained by including the organic toxicant in a petroleum distillate solution of an insecticidal product selected from the class of the extracts of pyrethrin- and rotenone-bearing plants.

It is among the objects of this invention to provide an improved spray composition for exterminating insect pests such as flies, mosquitoes etc., which will be more quickly toxic thereto than the fly sprays and insectifuges at present employed. A further object of the invention is to provide a composition compatible with the common insecticidal plant extracts such as pyrethrum extracts, rotenone and derris extracts.

I have found that allyl and propenyl phenols and certain of their derivatives have a higher insecticidal efficiency and are more suitable for use as fly sprays than are phenols in general. They possess the further marked advantage in that they cause rapid paralysis of the common insects such as flies, gnats etc. and can be used alone, or with pyrethrum, or especially with rotenone or derris extract, where rapid paralysis and consequent knockdown is necessary as is demanded by the Peet-Grady method.

The group of organic toxicants contemplated by the invention is characterized by the substitution of one or more allyl (—$CH_2$—$CH$=$CH_2$) or one or more propenyl (—$CH$=$CH$—$CH_3$) groups for one or more of the hydrogens of the benzene ring of monohydric and polyhydric phenols in which at least one phenolic group is free, and the beta and gamma halogen ethyl and propyl ethers of monohydric and polyhydric phenols in which one or more allyl or propenyl groups replace one or more hydrogens of the benzene ring and the alkyl ethers of the above phenols in which three or more hydrogens of the benzene ring have been substituted.

These organic toxicants form extremely effective fly spray compositions which are advantageous because of the rapid paralyzing action on the common insects such as flies, gnats, etc. and their great toxicity and are to be used alone, with pyrethrum extracts, with derris extracts, with rotenone or with mixtures of these as the case demands.

In the following illustrative examples, the insecticidal efficiencies of solutions of the organic toxicants contemplated by the invention show the enhancement of toxicity and rapid paralysis in the action of the organic toxicant on flies. The effectiveness of the combinations was determined by the Standard Peet-Grady method with five-day-old flies as described at pages 92 to 98 of "Pyrethrum Flowers" by C. B. Gnadinger, 1936 edition. Concentrations are expressed in the examples in grams (or in the case of liquids as cubic centimeters) per 100 cc. of solution at room temperatures. The official test insecticide (O. T. I.) which serves as the standard of comparison contained 0.1% pure pyrethrins in the same mineral oil base as the other compositions, and the figures under the column (O. T. I.) is the per cent kill in 24 hours. The columns headed Knockdown and Kill indicate the percentage knockdown in ten minutes and the percentage kill in 24 hours, respectively.

Monohydric phenols containing one or more allyl or propenyl groups substituted for one or more hydrogens of the benzene ring are effective toxicants of the invention and may be used alone or in conjunction with pyrethrum extract, or derris extract or rotenone, or combinations thereof. These toxicants cause rapid paralysis and hence high knockdown, and further possess excellent killing power, as the following examples show.

| Toxicant | Conc. | Kill | Knockdown | O. T. I. |
| --- | --- | --- | --- | --- |
| o-Methoxy,p-allyl phenol | 20 | 47.5 | 97.9 | 47.7 |
|  | 10 | 33.1 | 96.4 | 47.7 |
| o-Methoxy-p,propenyl phenol | 25 | 66.7 | 95.9 | 43.6 |
|  | 10 | 45.8 | 94.2 | 43.6 |

Alkyl ethers of phenols in which three or more hydrogens of the benzene ring have been substituted are effective toxicants of the invention when used alone, or when included in a petroleum distillate solution of an insecticidal product selected from the class consisting of the extracts of pyrethrin- and rotenone-bearing plants.

| Toxicant | Conc. | Kill | Knockdown | O. T. I. |
| --- | --- | --- | --- | --- |
| Allyl ether of o-methoxy, p-allyl phenol C$_6$H$_3$(OCH$_3$)(OCH$_2$—CH=CH$_2$)(CH$_2$—CH=CH$_2$) | 10 | 80.8 | 96.5 | 45.1 |
|  | 5 | 24.8 | 92.4 | 45.1 |
| Allyl ether of o-methoxy-p-propenyl phenol C$_6$H$_3$(OCH$_3$)(OCH$_2$—CH=CH$_2$)(CH=CH—CH$_3$) | 10 | 82.3 | 100.0 | 33.1 |
|  | 5 | 47.2 | 91.5 | 33.8 |
| Methyl ether of o-methoxy-p-allyl phenol C$_6$H$_3$(OCH$_3$)$_2$(CH$_2$—CH=CH$_2$) | 20 | 84.2 | 100.0 | 39.5 |
|  | 10 | 45.9 | 98.8 | 39.5 |
| Methyl ether of o-methoxy-p-propenyl phenol C$_6$H$_3$(OCH$_3$)$_2$(CH=CH—CH$_3$) | 20 | 71.7 | 97.9 | 39.5 |
|  | 10 | 47.4 | 98.9 | 39.5 |
| Iso safrole C$_6$H$_3$(OCH$_2$O)(CH=CH—CH$_3$) | 20 | 73.0 | 95.9 | 40.0 |
| Safrole C$_6$H$_3$(OCH$_2$O)(CH$_2$—CH=CH$_2$) | 20 | 25.9 | 99.0 | 40.0 |

Beta bromo ethyl ethers and gamma bromo propyl ethers of monohydric and polyhydric phenols in which one or more allyl or one or more propenyl groups replace one or more hydrogens of the benzene ring are effective toxicants of the invention, and may be used alone or in conjunction with pyrethrum, rotenone, derris extract or combinations thereof.

| Toxicant | Conc. | Kill | Knockdown | O. T. I. |
| --- | --- | --- | --- | --- |
| Beta brom ethyl ether of o-hydroxy-m-allyl anisole | 10.0 | 75.7 | 93.6 | 46.6 |

While I have disclosed a number of specific allyl phenols, propenyl phenols, alkyl ethers, and bromo alkyl ethers, it is to be understood that my invention is in no way restricted thereto but that any phenol or phenolic ether containing an allyl or propenyl substitution as specified in the aforementioned classes may be employed in practicing this invention.

| Toxicant | Conc. | Kill | Knockdown | O. T. I. |
| --- | --- | --- | --- | --- |
| o-Allyl phenol C$_6$H$_4$(OH)(—CH$_2$—CH=CH$_2$) | 25 | 58.4 | 96.4 | 56.8 |
|  | 20 | 51.3 | 97.2 | 30.3 |
|  | 15 | 40.5 | 95.1 | 56.8 |
| o,o-Di allyl phenol C$_6$H$_3$(OH)(—CH$_2$—CH=CH$_2$)$_2$ | 20 | 75.9 | 95.5 | 54.8 |
|  | 10 | 56.9 | 90.2 | 54.8 |
|  | 5 | 27.9 | 67.9 | 54.8 |
| o,o,p-Tri allyl phenol C$_6$H$_2$(OH)(—CH$_2$—CH=CH$_2$)$_3$ | 20 | 96.6 | 97.2 | 44.8 |
|  | 10 | 88.3 | 97.9 | 44.8 |
|  | 5 | 71.5 | 99.7 | 47.2 |
| o-Allyl,o,p-di chlor phenol C$_6$H$_2$(OH)(—CH$_2$—CH=CH$_2$)(Cl)$_2$ | 5 | 59.5 | 91.1 | 38.1 |
|  | 7 | 83.0 | 91.5 | 56.8 |

Dihydric phenols containing one or more allyl or propenyl radicals substituted for one or more hydrogens of the benzene ring and further where one phenolic group is free are among the toxicants of the invention and produce extremely effective insecticidal compositions (e. g. fly sprays) when used alone, or in conjunction with pyrethrum extract, or derris extract, or rotenone or combinations thereof.

The following examples illustrate the effectiveness of various insecticidal (spray) compositions of the invention containing an organic toxicant of the invention and pure pyrethrins (Pyr.) or rotenone (Rot.) or derris extract (Der.). The data in the kill column were secured after 24 hours with the sprays containing pyrethrum extract, and after 48 hours with the sprays containing rotenone or derris extract.

| Toxicant | Conc. | Pyr. | Rot. | Der. | Kill | Knockdown | O. T. I. |
|---|---|---|---|---|---|---|---|
| o-Allyl,o-p-di chlor phenol | 3.5 | | 0.05 | | 81.3 | 95.8 | 50.3 |
| o,o-Di allyl phenol | 2.5 | 0.05 | | | 63.1 | 99.9 | 56.3 |
| Iso safrole | 7.5 | | 0.05 | | 85.0 | 95.3 | 50.3 |
| o-Methoxy-p-allyl phenol | 7.5 | | 0.05 | | 92.3 | 97.2 | 50.3 |
| o-Allyl-p-methoxy phenol | 5.0 | | 0.05 | | 88.8 | 95.7 | 50.3 |
| o-Methoxy-p-propenyl phenol | 2.5 | 0.05 | | | 40.1 | 98.7 | 36.1 |
| Methyl ether of o-methoxy-p-allyl phenol | 7.5 | | 0.05 | | 68.3 | 97.9 | 50.3 |
| Iso safrole | 7.5 | | 0.05 | | 85.0 | 95.3 | 50.3 |

Insecticidal compositions containing varying amounts of the organic toxicants of the invention according to the toxicant are as effective and even more effective than the official test insecticide. These toxicants possess the remarkable property of paralyzing flies almost immediately and of causing the death of such a number of flies as is governed by the concentration of the toxicant in the insecticidal composition. Increasing the number of allyl or propenyl groups on the benzene ring of a phenol causes increased rapidity of action and a greater degree both with respect to knockdown and kill. Further increase in toxicity and knockdown are secured by the formation of suitable derivatives or substitution products such as hereinbefore described. When used in conjunction with 0.05% pyrethrum (one-half that contained in the official test insecticide) or with 0.05 to 0.005% of rotenone or derris extract as little as 0.5 to 7.5% of an organic toxicant of the invention gives a surprisingly superior insecticide. Thus the invention permits the replacement, in whole or in part, of the relatively expensive pyrethrum extract or derris extract, or rotenone with the synthetic and more easily available organic toxicants hereinbefore described in any proportion to produce effective insect sprays, thereby effecting superior sprays and substantial economy in the manufacture of such sprays.

I claim:

1. An insecticidal composition comprising a toxic compound selected from the group consisting of monohydric phenols and polyhydric phenols, said phenolic compound having at least one phenolic group free and at least one hydrogen of the benzene ring replaced by at least one radical selected from the group consisting of allyl and propenyl, and a petroleum distillate solution of an insecticidal material selected from the group consisting of pyrethrum and rotenone-bearing plants.

2. An insecticidal composition according to claim 1 in which the allyl and propenyl groups do not exceed three.

EDWARD HARVILL.